May 4, 1965 S. JANSON ETAL 3,182,138

METHOD OF AND CIRCUIT ARRANGEMENT FOR SUPERVISING AND MAINTAINING COAXIAL LINES

Filed March 21, 1961

United States Patent Office 3,182,138

Patented May 4, 1965

3,182,138

METHOD OF AND CIRCUIT ARRANGEMENT FOR SUPERVISING AND MAINTAINING COAXIAL LINES

Stig Janson, Stockholm, and Viking Stending, Tjadern, Sweden, assignors to Siemens & Halske Aktiengesellschaft Berlin and Munich, a corporation of Germany Filed Mar. 21, 1961, Ser. No. 97,199
Claims priority, application Sweden, Mar. 31, 1960, 3,176/60
10 Claims. (Cl. 179—175.31)

Figure 1:
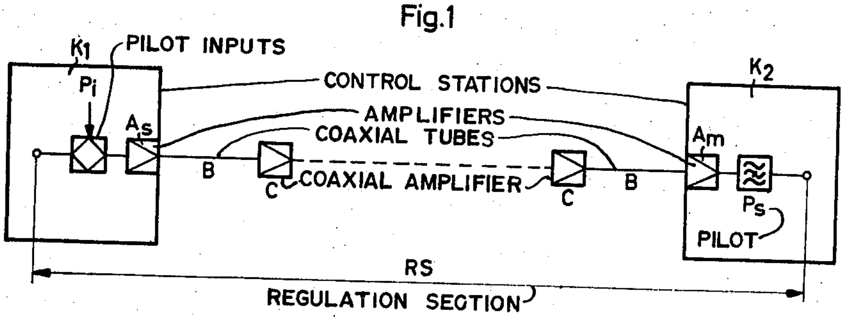

This invention is concerned with a method of and a measuring arrangement for supervising and maintaining common transmission lines (coaxial lines) in coaxial systems for carrier frequency telephony.

In modern coaxial systems for telephony, thousands of telephone calls are transmitted over a common coaxial line—in the most modern systems up to 2700 carrier frequency telephone calls per coaxial line. The coaxial line thereby comprises for each transmission direction a coaxial tube with amplifiers associated therewith. The amplifiers are arranged spaced apart, for example, by about 5 kilometers, each amplifier comprising a plurality of electron tubes, for example, 5 tubes. The amplifiers operate with feedback so as to obtain the required amplification stability and linearity. These amplifiers are normally disposed in unattended stations which are checked at regular intervals. The supervision and maintenance of the coaxial lines is taken care of from attended control stations which are on the average spaced apart, for example, by about 150 kilometers. Accordingly, there are in a coaxial line section extending between two control stations, a so-called regulation section, about 60 amplifiers (30 in each transmission direction), including altogether several hundred electron tubes. It is important, for reasons of economy as well as operating reliability, that these electron tubes are supervised and controlled in a simple and effective manner. Various methods for supervising and replacing electron tubes have been proposed. However, these methods are either very complicated or of unsatisfactory reliability.

A filament break occurs in modern types of tubes extremely rarely. The useful life of a tube is however as a rule limited by reduced mutual conductance and/or by reduction of the anode or plate current with increased intermodulation, consequently producing disturbances in the telephone channels. The greater part of disturbances occurring in a coaxial line is caused by aging tubes, by reduced mutual conductance thereof and/or by low anode current. The useful life of a tube is therefore as a rule a function of the number of effective operating hours during which the tube can be used before the mutual conductance thereof and/or the plate current drop below a given value. A dependence of the mutual conductance on the plate current and vice versa, as a function of operating time of a tube, does not exist. It even happens frequently that the mutual conductance has dropped to the limit of junking a tube while the plate current is still within the tolerance limit, and vice versa.

The measurements of these values on tubes while they are in their operating circuits become quite complicated and inaccurate because they are circuited in direct current feedback over the cathode resistors, whereby the plate current is held as constant as possible. The removal of tubes from the amplifiers, for measuring the mutual conductance and the plate current, in a separate tube testing device, as practiced in some situations, can easily lead to disruption of the service and possible damage to tubes and their sockets.

Tubes are in some instances junked after a given operating time, generally after one year. However, this involves a great waste and is by no means satisfactory from the standpoint of operating reliability, since the useful life of the individual tubes, in a group of tubes, is not the same, exhibiting, as it does, great variations. It may generally be said that the probable lifetime of a new tube is as long as the probable remaining lifetime of a functioning old tube, irrespective of how long the latter has been used. It follows, therefore, that the trouble frequency of a group of functioning tubes is independent of the time of use thereof.

It has also been attempted to measure the cathode activity of tubes, which is defined as an alteration of the anode or plate current in dependence upon the alteration of the heating current. There is indeed a certain reciprocal relation between the cathode activity and the mutual conductance of a tube; this reciprocal relation is however unsatisfactory. The measurement becomes extraordinarily difficult owing to the previously mentioned direct current feedback extending over the cathode resistors, and can be carried out only with difficulties to obtain sufficiently accurate results, with tubes under operating conditions. The exclusive use of this procedure would for these reasons require, among others, to draw the tolerance limits very close. The risk resulting thereby is, that faultless tubes might be junked, thus rendering the procedure uneconomical. It must be considered in this connection, that tubes used in coaxial amplifiers are relatively speaking very expensive.

All the above outlined methods are unreliable or uneconomical or both. Attempts have therefore been made to modify or to supplement some of the procedures without, however, arriving at a satisfactory solution. One of the attempts involved measurement of the noise attenuation of the entire regulation section so as to obtain a criterion for the linearity. A signal with a frequency $f$ is thereby transmitted through the regulation section and the level of the harmonics $2f$ and $3f$ is measured at the terminal point. In another attempt, two signals with the frequencies $f_1$ and $f_2$ were transmited through the regulation section and the level of the intermodulation products $f_1 \pm f_2$ was measured at the terminal point, whereby the frequencies were for practical reasons selected so that a plurality thereof corresponded to some of the gap pilot frequencies recommended by the CCITT (Comite Consultatif International Telegraphique et Telephonique). This made it possible to carry out the measurement with the coaxial line in operation.

The term gap pilots is understood to mean signals which are transmitted through a regulation section, as required for measuring purposes, so as to obtain a control of the operation attenuation, whereby the frequencies of the signals are selected so that they are outside the frequency ranges employed for transmission, that is, that they are within the socalled frequency gaps. With the exception of two gap pilots, the frequencies of which lie in the lowest order, these gap pilots are found, in a 4 megacycle coaxial system, in an internal spacing of 248 kilocycles. The magnitude of the frequency gap amounts in this case to 8 kilocycles. In a 4 megacycle coaxial system, the highest frequencies of these gap pilots are at 2792, 3040, 3288, 3536 and 3784 kilocycles. In a 12 megacycle system, the highest frequencies of the gap pilots are at 8472, 9792 and 11,112 kilocycles.

It was however found that these noise or intermodulation measurements do not give any reliable data as to the linearity of the regulation section in the case of other frequency combinations. The procedure can be employed for indicating if there is only one very faulty tube or, more generally expressed, one single amplifier which is very non-linear, but if there are several amplifiers which are non-linear, which is often the case in practical operation with many aged tubes, these amplifiers can largely compensate the mutual operative effects with regard to the combination frequencies $f_1 \pm f_2$ as well as with regard to the harmonics. This is occasioned by the fact that harmonics as well as the combination frequencies $f_1+f_2$ of the various amplifiers on the coaxial line arrive at the terminal end of the concerned regulation section in different phase position. (See in this connection TELE, No. 3, 1959, page 180 et seq., S. Janson-V. Stending, Some Problems Concerning Disturbances in Wide Band Systems; especially page 186, the lower curve in Fig. 10, which gives the addition of the $A+B$ products along a 4 megacycle coaxial line.) There is, therefore, the great danger that several faulty tubes in a regulation section remain in this procedure undetected.

It may also happen in practical operation, that the worsening of a tube or of an amplifier will cause an indication pointing to an improvement of the results in the measuring of a whole regulation section, such indication being possible because the intermodulation product of an amplifier can operatively act opposite to the action of the remaining amplifiers. Contrariwise, an improvement of a faulty amplifier, effected, for example, by replacing a tube, can result, with a given frequency combination, in worsening the results for the entire regulation section. Accordingly such measurement is likewise unsuitable. Indeed, despite the great number of tubes which are in operation, no reliable and simple method for coping with the important matter of tube maintenance has been known at all until now. The maintenance of the tubes is attended to more or less haphazardly according to the judgment of the maintenance personnel.

According to the present invention, the intermodulation measurement is to be effected with respect to sections of a coaxial line, and preferably involving entire regulation sections. The respective sections shall in each transmission direction consist of a coaxial tube with coaxial amplifiers at the terminal points and amplifiers disposed therebetween approximately equally spaced apart. An intermodulation product shall thereby be measured, in which components contributed by the individual amplifiers act voltage-wise in additive sense, that is, in which the components appear at the receiving end in practically the same phase, which happens only in the case of given intermodulation products of odd ordinal numbers. An abnormal intermodulation is thereby detected without fail.

The intermodulation products which are in accordance with the present invention suitable are of odd ordinal numbers, for example, third ordinal $2f_1-f_2$ or $f_1+f_2-f_3$, the frequencies being thereby advantageously selected so that the frequencies $f_1$ and $f_2$ as well as the frequency $f_3$ (if it appears) and also the sought for intermodulation product, are in rather close proximity, for example, within one half octave. The frequencies can be selected so that gap pilots with suitable measuring frequency level can be used, whereby the measurements can be effected easily and with the coaxial line in operation.

Figure 2:
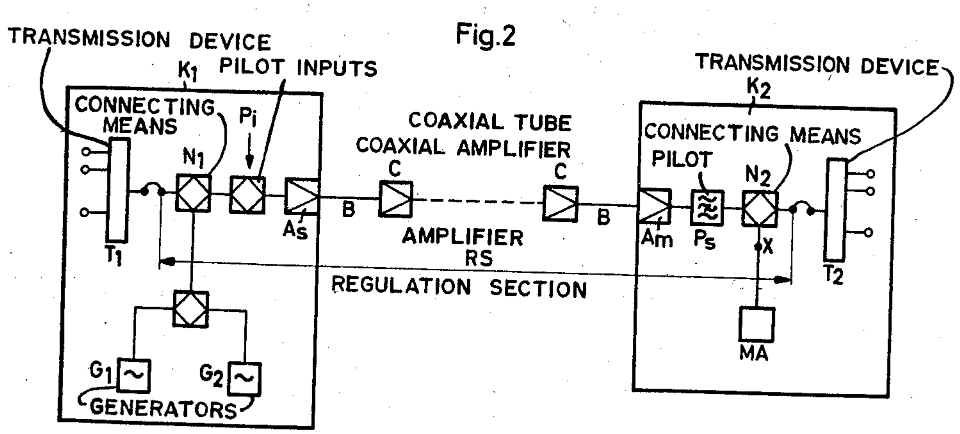
Figure 3:
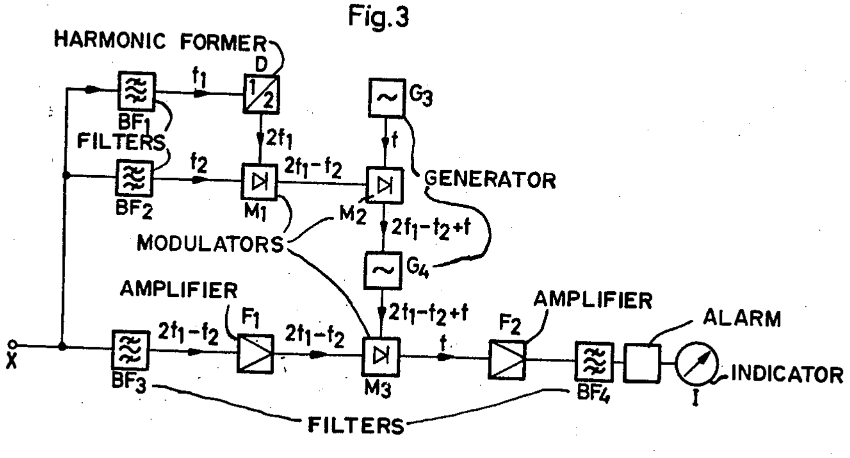

The invention shall now be described with reference to the accompanying drawing, wherein FIG. 1 shows in schematic manner a regulation section;

FIG. 2 represents an example of an embodiment according to the invention, for intermodulation measurements between two attended control stations; and FIG. 3 shows an example of an embodiment of a measuring device for practicing the invention.

In FIG. 1, K1 and K2 indicate attended control stations, $A_s$ and $A_m$ indicate amplifiers at the transmitting and receiving ends, respectively, P*i* indicates the input of pilots for regulation or control purposes (not to be confused with the previously mentioned gap pilots), P*s* indicates a pilot block for regulation or control pilots, C indicates a number of coaxial amplifiers which are approximately equally spaced apart in the coaxial tube B, and RS indicates the whole regulation or control section.

A coaxial line extending between two control stations is hereinafter referred to as regulation or control section. One or more signals with predetermined frequencies (for example, 4092 kilocycles, in a 4 megacycle system and 308, 4287 and 12,435 kilocycles, in a 4 megacycle system), socalled regulation or control pilots, are continuously transmitted over a control section in both directions of transmission, for automatically controlling the operation of control devices with the object of regulating the amplification of the individual amplifiers to the correct value. The control pilots are supplied directly ahead of the transmitter amplifier A*s* and are blocked at P*s* directly after the receiver amplifier A*m*. Accordingly, a control or regulation section is a coaxial line with input and output devices and amplifiers considered as an entity.

FIG. 2 shows in schematic manner an example of an embodiment for measuring an intermodulation product $2f_1-f_2$ in one transmission direction of a regulation section RS. T1 and T2 indicate the carrier frequency transmission devices at the attended control stations K1 and K2, and A*s*, A*m* indicate respectively the transmitter amplifier and the receiver amplifier; C indicates coaxial amplifiers arranged in the coaxial tube B approximately equally spaced apart, and P*i*, P*s* indicate respectively the pilot input and the pilot block.

The two signals $f_1$ and $f_2$ are respectively produced in the generators G1 and G2. These generators are at the transmitting control station, in the instant case station K1, suitably connected to the coaxial line, for example, by means of suitable filters, differential transformers or attenuation means, indicated in FIG. 2 by N1.

A measuring device MA, which will be presently described more in detail with reference to FIG. 3, is provided at the receiving station, in the present case the station K2, and suitably connected thereat with the same coaxial line serving the same transmission direction also served by the control station K1, for example, by means of suitable differential transformers or attenuation means, indicated in FIG. 2 by N2.

The difference between the levels of the signals forming the intermodulation and the intermodulation products, is normally very great. It is necessary to select a relatively high level from 0 to +10 dbm0 for the signals forming the intermodulation and to provide great selectivity for the receiver part of the measuring arrangement, so as to avoid an effect of line noise, thermal noise and intermodulation noise, on the measuring results (dbm0 (Nm0) being defined as the abolute power level in decibels (in nepers), referred to the zero relative level point). Upon utilizing gap pilots as signals for forming the intermodulation, it is therefore necessary that such signals are during the measuring transmitted with a level higher by 20–30 db than is recommended according to CCITT.

As mentioned before, the measuring arrangement must be of highest selectively (band width in the order of magnitude of 10 cycles). Accordingly, in case of selective measuring devices of normal structure, practically impossible requirements would have to be posed for the frequency accuracy of the generators G1 and G2 (allowed frequency deviations from the nominal value would have to be smaller than 10 cycles). However, this difficulty can be overcome in simple manner by particular construction of the measuring devices, providing in the measuring device, in one or more stages thereof, for demodulation of the intermodulation product by the signals which have formed the intermodulation product or by signals composed thereof.

FIG. 3 shows an example of an embodiment of a measuring arrangement which is suitable for measuring the intermodulation products according to the present invention. The construction of the measuring arrangement is indicated in block diagram manner. The point marked X corresponds to the similarly marked point in FIG. 2, being the point of connection of the measuring arrangement in the control station K2. At this point arrive the measuring signals produced by the generators G1 and G2 and transmitted from the sending station K1, the frequencies of which are assumed to be $f_1$ and $f_2$, and also the intermodulation products of various kinds, among others $2f_1-f_2$.

The input circuits of the measuring arrangement comprise in the illustrated example three parallel connected relatively narrow bandpass filters BF1, BF2, BF3. The filter BF1 passes only signals with the frequency approximately equal to $f_1$, filter BF2 only signals with the frequency approximately equal to $f_2$, and filter BF3 only signals approximately equal to $2f_1-f_2$, that is, the intermodulation product, the level of which is to be measured. Accordingly, in the filter BF1 is effected the filtering out of the signals with the frequency $f_1$ and this signal is conducted to a socalled harmonics former D, from which is obtained the signal with the frequency $2f_1$, this latter signal being conducted to a first modulator M1. To the modulator M1 is also conducted the signal with the frequency $f_2$, which is filtered out by the filter BF2. From the modulator M1 is accordingly obtained a signal with the difference frequency $2f_1-f_2$, such signal being conducted to another modulator M2. A local generator G3 in the measuring arrangement, produces a signal with a suitable fixed frequency $f$, which is likewise conducted to the modulator M2. The signal frequencies are added in the modulator M2 and there is thus obtained a signal with the frequency $2f_1-f_2+f$. This latter signal controls the operation of the generator G4 with the specific frequency $2f_1-f_2+f$, thus forming a signal which is conducted to a third modulator M3, the latter also receiving the intermodulation product $2f_1-f_2$ which is filtered out by the bandpass filter BF3 and amplified in an amplifier F1. From the modulator is accordingly obtained a signal with the constant frequency $f$, which is amplified in an amplifier F2 and thereupon filtered in a very narrow selectivity-determining bandpass filter BF4. The signal obtained from the filter BF4 is in usual manner measured by means of an instrument I, which may be an ordinary pointer instrument or a recording instrument.

The measuring arrangement may be advantageously cooperatively associated with an alarm device which actuates an alarm whenever the signal level U, i.e. the signal voltage delivered at the output of the measuring arrangement, exceeds a predetermined limit value. The alarm device may for example comprise a voltage sensitive relay or the like.

The present invention is not inherently limited either for use in connection with coaxial systems for carrier frequency telephony, or to amplifiers with electron tubes. For example, the invention may be used in connection with directional wireless channels. The transmission system may also comprise wholly or partially transistorized amplifiers.

The present invention provides for assured and reliable indication of poor linearity of one or more amplifiers included in a control or regulation section. These amplifiers can then be localized in various ways. For example, the amplifiers may be successively replaced by spare amplifiers, thereby ascertaining the amplifier or amplifiers which affected the linearity. The manner in which the intermodulation product increases at the various amplifiers along the coaxial line, can also be measured. It is likewise possible to measure the harmonics formation ($2f$ and $3f$) in each amplifier or to check by measurement any desired and suitable tube property.

The maintenance and measurement of the individual amplifiers and tubes should be taken care of regularly even in the presence of satisfactory results obtained in the intermodulation measurement according to the invention. However, relatively great tolerances can be admitted in the course of these regular measurements so long as the intermodulation measurements yield satisfactory results, thereby avoiding unnecessary junking of functioning tubes. The considerable importance of the present invention resides in avoidance of unnecessary and costly junking of tubes and in reliable and effective supervision of transmission lines which are common to thousands of important telephone connections, thus avoiding unnecessary service interruptions and assuring good quality of the individual telephone connections.

Changes may be made within the scope and spirit of the appended claims which define what is believed to be new and desired to have protected by Letters Patent.

We claim:

1. A method of supervising line sections forming parts of coaxial devices for telephone purposes, preferably regulation sections, comprising in each transmission direction a coaxial tube, with coaxial amplifiers inserted at approximately equal spacing, wherein the linearity of the section is determined by repeatedly applied measurement of intermodulation; comprising the steps of transmitting a plurality of signal frequencies over the section to be supervised, measuring at the receiving end the level of such intermodulation products of odd order of at least two signal frequencies which are transmitted over such section, adding up as to voltage the contributions of the individual amplifiers, which contributions arrive at the receiving end with practically the same phase.

2. A method of supervising line sections forming parts of coaxial devices for telephone purposes, preferably regulation sections, comprising in each transmission direction a coaxial tube, with coaxial amplifiers inserted at approximately equal spacing, wherein the linearity of the section is determined by repeatedly applied measurement of intermodulation, comprising the steps of transmitting two frequencies $f_1$ and $f_2$ over the section to be supervised, measuring at the receiving end the level of intermodulation products of odd order including the product $2f_1-f_2$ transmitted over such sections, adding up as to voltage the contributions of the individual amplifiers, which contributions arrive at the receiving end with practically the same phase.

3. A method of supervising line sections forming parts of coaxial devices for telephone purposes, preferably regulation sections, comprising in each transmission direction a coaxial tube, with coaxial amplifiers inserted at approximately equal spacing, wherein the linearity of the section is determined by repeatedly applied measurement of intermodulation, comprising the steps of transmitting three frequencies $f_1$, $f_2$ and $f_3$ over the section to be supervised, measuring at the receiving end the level of intermodulation products of odd order including the product $f_1-f_2-f_3$ transmitted over such section, adding up as to voltage the contributions of the individual amplifiers, which contributions arrive at the receiving end with practically the same phase.

4. A method of supervising line sections forming parts of coaxial devices for telephone purposes, preferably regulation sections, comprising in each transmission direction a coaxial tube, with coaxial amplifiers inserted at approximately equal spacing, wherein the linearity of the section is determined by repeatedly applied measurement of intermodulation, comprising the steps of transmitting a plurality of signal frequencies over the section to be supervised, so selecting said frequencies that the intermodulation product lies approximately within a half octave, measuring at the receiving end the level of intermodulation products of odd order of at least two signal frequencies which are transmitted over such section, adding up as to voltage the contributions of the individual amplifiers, which contributions arrive at the receiving end with practically the same phase.

5. A method of supervising line sections forming parts of coaxial devices for telephone purposes, preferably regulation sections, wherein gap pilot frequencies are utilized in connection with the operation thereof, comprising in each transmission direction a coaxial tube, with coaxial amplifiers inserted at approximately equal spacing, wherein the linearity of the section is determined by repeatedly applied measurement of intermodulation, comprising the steps of transmitting a plurality of frequencies over the section to be supervised, with the level of the transmitted signals being from 0 to 10 dbm0, so selecting said frequencies that the intermodulation product lies approximately within a half octave and that at least one of said signal frequencies corresponds to the frequency of a previously determined gap pilot, measuring at the receiving end the level of intermodulation products of odd order of at least two signal frequencies which are transmitted over such section, adding up as to voltage the contributions of the individual amplifiers, which contributions arrive at the receiving end with practically the same phase.

6. A circuit for measuring the level of the intermodulation products of odd ordinal numbers of transmitted signals in connection with supervising and maintaining coaxial telephone sections which respectively comprise, in each communication direction, a coaxial tube having coaxial amplifiers inserted therein at approximately equally spaced distances therealong for the transmission of signals thereover from the transmitting side to the receiving side thereof, comprising a plurality of parallel connected bandpass filters operatively connected to the section of the coaxial line involved, at the receiving side thereof for filtering out the signal frequencies and intermodulation frequencies transmitted over the coaxial line, a harmonics generator for producing a signal with a given frequency, one of said filters having the output thereof operatively connected with the input of said harmonics generator, a first modulator, the output of said harmonics generator and the output of another of said bandpass filters being operatively connected to said modulator whereby the latter is operative to produce an intermodulation frequency, a second modulator to which the output of said first modulator is connected, a local generator for producing a signal of fixed frequency, having its output connected to said second modulator, whereby said second modulator is operative to produce a signal with another predetermined frequency, a third modulator to which the output of said second modulator is operatively connected, another of said bandpass filters having its output operatively connected to said third modulator for supplying the intermodulation product filtered out thereby to said third modulator, whereby said third modulator delivers a signal with a fixed frequency, a selectivity-determining bandpass filter to the input of which the output of said third modulator is operatively connected, whereby the signal generated by the local generator appearing at the output of said third modulator is filtered out, and a measuring instrument operatively connected to the output of said last mentioned bandpass filter for measuring the level of the intermodulation product appearing at the output thereof.

7. A circuit as defined in claim 6, comprising in further combination therewith, means at the transmitting end of said section for transmitting signals thereover, at least one of which corresponds to the frequency of predetermined gap pilots, at a level amounting to 0 to 10 dbm0.

8. A circuit as defined in claim 6, wherein the network of said parallel connected bandpass filters has a bandwidth smaller than the frequency deviation from the nominal value of the signals which form the intermodulation, and the frequency characteristics of the filters and of said generators are such that the intermodulation product to be measured is modulated with the signals from which such product was formed.

9. A circuit as defined in claim 6, wherein the network of said parallel connected bandpass filters has a bandwidth smaller than the frequency deviation from the nominal value of the signals which form the intermodulation, and the frequency characteristics of the filters and of said generators are such that the intermodulation product to be measured is modulated with the signals composed of the signals from which such product was formed.

10. A circuit as defined in claim 7, comprising in further combination an alarm device operatively connected to the output of the third modulator for automatically giving an alarm when the output level thereof exceeds a predetermined level.

References Cited by the Examiner

UNITED STATES PATENTS

| | | | |
|---|---|---|---|
| 2,432,214 | 12/47 | Sontheimer | 179—175.31 |
| 2,530,596 | 11/50 | Blok | 324—57 |
| 2,686,849 | 8/54 | Thomas | 179—175.3 |
| 2,929,989 | 3/60 | Hurvitz | 324—57 |
| 2,987,586 | 6/61 | Berger | 324—57 |

FOREIGN PATENTS

| | | |
|---|---|---|
| 1,037,518 | 8/58 | Germany. |

OTHER REFERENCES

Electronics, vol. 24, No. 27; July 7, 1961; pages 57–59.

Audio Engineering, November 1950; pages 24 and 25, 56–58.

ROBERT H. ROSE, *Primary Examiner.*

WILLIAM C. COOPER, *Examiner.*